United States Patent [19]
Hitchcock

[11] 3,749,436
[45] July 31, 1973

[54] TRACTOR BUMPER CONSTRUCTION
[75] Inventor: Delbert Hitchcock, Wooster, Ohio
[73] Assignee: H & H Manufacturing Company, Wooster, Ohio
[22] Filed: Aug. 9, 1971
[21] Appl. No.: 170,198

[52] U.S. Cl................ 293/73, 293/69 R, 224/42.44
[51] Int. Cl......................... B60r 19/04, B60r 11/00
[58] Field of Search...................... 293/69 R, 73, 60, 293/64; 224/42.44

[56] References Cited
UNITED STATES PATENTS

| | | | |
|---|---|---|---|
| 2,537,553 | 1/1951 | Schonauer | 280/491 |
| 1,562,694 | 11/1925 | Farum | 293/73 X |
| 3,210,110 | 10/1965 | Chieger | 293/73 |
| 3,533,654 | 10/1970 | Kannegieter | 293/73 |
| 2,639,933 | 5/1953 | Meyer et al. | 293/73 |

Primary Examiner—Robert G. Sheridan
Assistant Examiner—Robert Saifer
Attorney—John H. Bishop and Joseph Frease et al.

[57] ABSTRACT

A tractor bumper for attachment to the front end of a tractor. The bumper has a pivotally mounted frame assembly movable from a vertical to a horizontal position. Mounting plates are attached to each end of the frame assembly and extend perpendicularly and rearwardly therefrom and are pivotally attached to a pair of horizontal tractor mounting brackets. A spring biased lever having a projecting pin is movably mounted on each of the mounting plates. The pins extend into slots formed in the mounting brackets to latch the frame assembly in vertical position. A boss projects from the frame assembly to hold the frame assembly in horizontal position. Vertical grill posts form openings in the frame assembly in which ballast weights may be positioned and mounted on the frame assembly.

1 Claim, 10 Drawing Figures

PATENTED JUL 31 1973 3,749,436
SHEET 1 OF 2
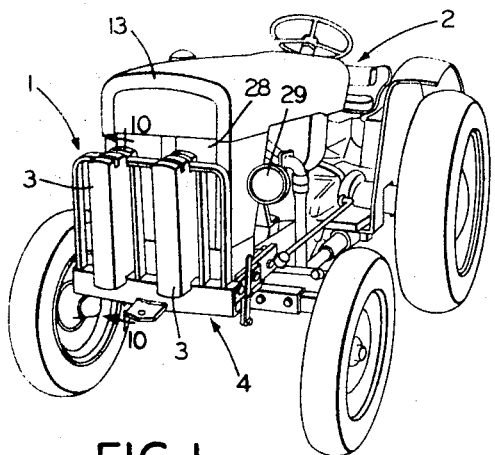
FIG. 1
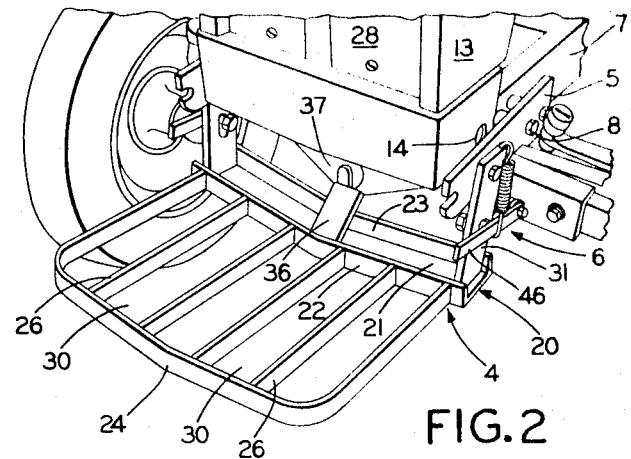
FIG. 2
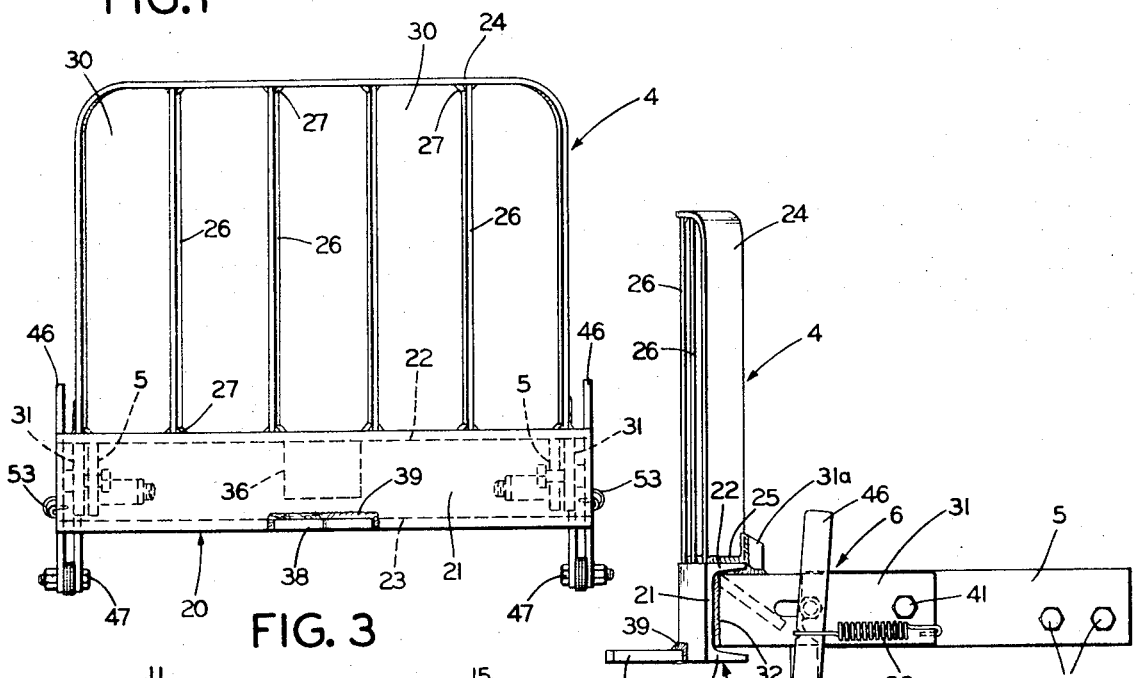
FIG. 3
FIG. 5
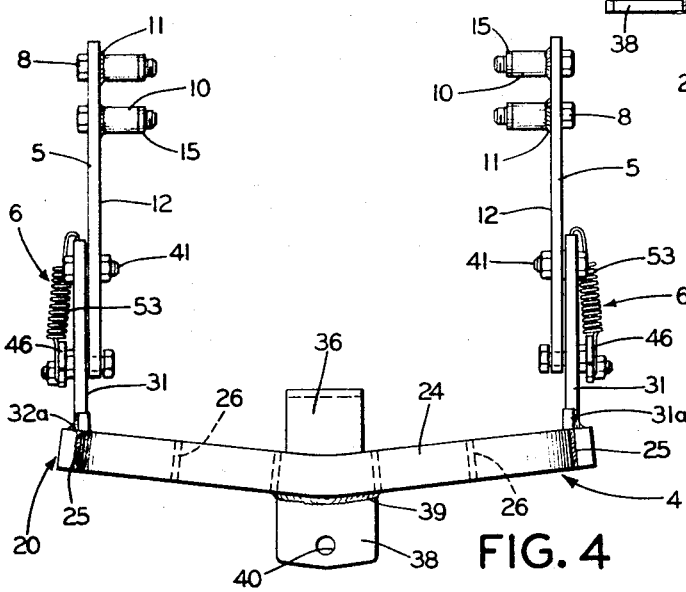
FIG. 4
INVENTOR
DELBERT HITCHCOCK
Frease & Bishop
ATTORNEYS

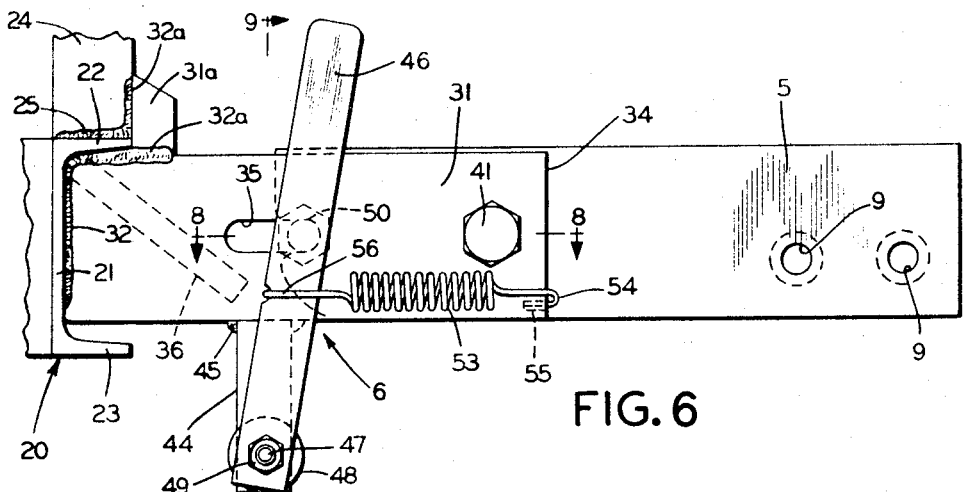
FIG. 6
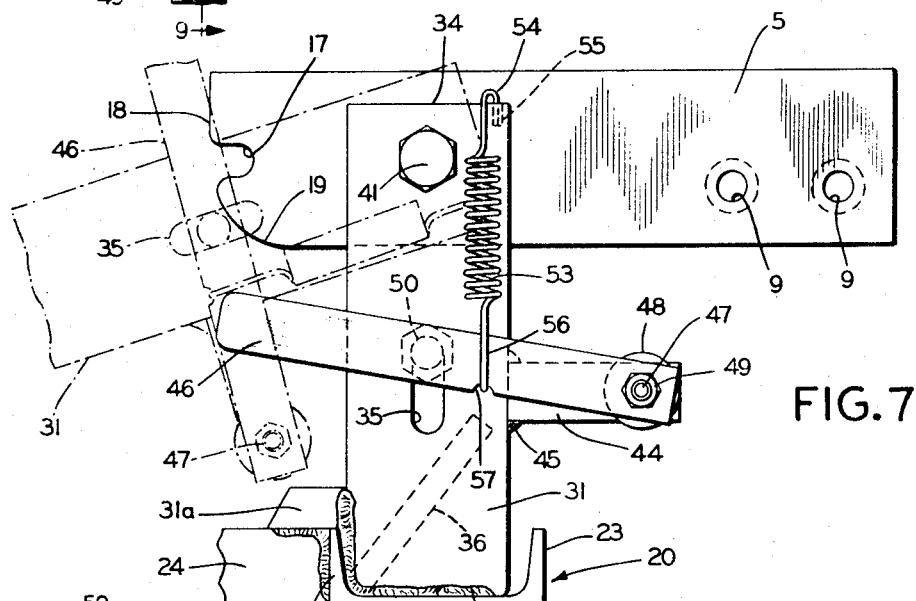
FIG. 7
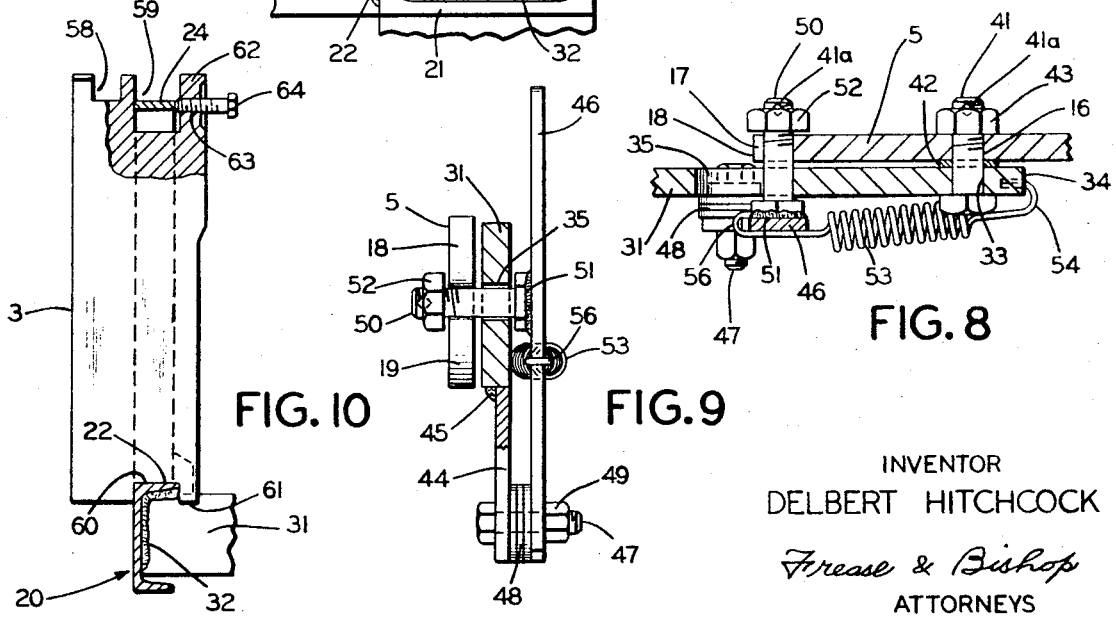
INVENTOR
DELBERT HITCHCOCK
Frease & Bishop
ATTORNEYS

TRACTOR BUMPER CONSTRUCTION

BACKGROUND OF THE INVENTION

1. Field of the Invention

The invention relates to tractors and in particular to a bumper construction mounted on the front end of a tractor. More particularly the invention relates to a pivotally mounted tractor bumper construction movable between vertical and horizontal positions. A plurality of ballast weights may be mounted on the bumper when in vertical position and the bumper may function as a carrying rack when in horizontal position with the weights removed.

2. Description of the Prior Art

For many years weights have been mounted on the front end of a tractor to increase the tractive effort and power output of the tractor for certain types of tractor operations.

Various types of weights detachably mounted on the front end of a tractor have been proposed and used, some of which also function as the tractor bumper. Examples of such constructions are shown in U.S. Pat. Nos. 2,701,728; 3,003,785; 3,032,352; 3,490,787 and 3,517,941.

These constructions have proven satisfactory for their intended purposes. However, these prior weight carrying bumpers usually are bolted to the tractor and only a small amount of horizontal adjustment is possible.

Some of the tractors presently used have a hood pivotally mounted on the front of the tractor, so that the entire hood may swing forward to completely uncover the tractor engine to provide for repairs and maintenance.

This presents problems when a front end bumper is mounted on such a tractor, especially a bumper construction rigid and strong enough to carry weights, as well as to protect the tractor front end from damage. Such bumpers also must be capable of being moved from normal position protecting the front of the tractor to a position which permits the hood to be moved to uncover the engine.

Several types of pivotally mounted automobile bumpers have been known as shown in U.S. Pat. Nos. 1,562,694 and 1,660,618. These bumpers have a single pivot and support pin at each pivot point. Such construction does not provide the strength and stiffness required to support the weight load involved in tractor operation.

I am unaware of any tractor bumper construction that provides a simple and sturdy mechanism for pivotally mounting a bumper on the front of a tractor which is strong enough to support the weight load desired for tractor operation when the bumper is in protective position, and which may be moved easily away from such protective position, to permit tractor hood movement to uncover the tractor engine.

SUMMARY OF THE INVENTION

Objectives of the invention include providing a tractor bumper construction for the front end of a usual tractor having a front frame portion which is pivotally attached for movement between a vertical, protective position to a horizontal position to permit a pivotally mounted tractor hood to be moved forwardly away from the front of the tractor; providing a tractor bumper construction in which the frame portion is formed with a plurality of spaced openings into which weights may be inserted and secured to provide tractor ballast; providing a tractor bumper construction having lug means engageable with a tractor front axle housing enabling the frame portion to function as a load carrier when in a horizontal position; providing a tractor bumper construction having a hitch extending outward from the front end of the frame for coupling implements; providing a tractor bumper construction in which a latching mechanism, pivotally mounting the front frame portion, has pin means on each side of the bumper, in which one pin functions as a pivot pin for the frame portion, and in which the other pin is spring biased to latch the frame portion fixed in vertical position and cooperates with the one pin to support the frame and attached weights in ballast position; providing a tractor bumper construction in which the protective frame portion is movable easily from vertical to horizontal position by movement of two spring biased levers and which automatically latch the frame in vertical position when moved from horizontal position; and providing a tractor bumper of simple construction which is sturdy and durable in use, which achieves the stated objectives in a simple, effective and inexpensive manner, and which solves problems and satisfies needs existing in the art.

These objectives and advantages are obtained by the tractor bumper construction, the general nature of which may be stated as including a pair of mounting brackets; means mounting one end of said brackets on the front end of a tractor; bumper frame means having plate members pivotally mounted on the other end of said brackets and movable between vertical and horizontal positions; means releasably latching the frame means in vertical position; the latch means including pin means releasably engageable between the plate members and mounting brackets when the frame means is in vertical position; lever means movably mounted on the plate members, said pin means being mounted on and projecting from the lever means; spring means biasing the lever pin means toward latched position; boss means projecting from the frame means and engageable with a portion of a tractor to hold the frame means in horizontal position; and the frame means including a plurality of spaced post means forming openings therebetween for mounting weights on the frame means within the openings.

BRIEF DESCRIPTION OF THE DRAWINGS

A preferred embodiment of the invention — illustrative of the best mode in which applicant has contemplated applying the principles — is set forth in the following description and shown in the drawings and is particularly and distinctly pointed out and set forth in the appended claims.

FIG. 1 is a perspective view of a tractor having the improved bumper construction mounted thereon, shown in the vertical weight carrying position with two weights attached thereto;

FIG. 2 is an enlarged fragmentary perspective view showing the improved bumper construction in the horizontal, carrying-rack position;

FIG. 3 is a front elevation of the improved tractor bumper construction;

FIG. 4 is a top plan view of the tractor bumper construction;

FIG. 5 is a side elevation of the tractor bumper construction shown in FIGS. 3 and 4;

FIG. 6 is an enlarged fragmentary side elevation of the bumper latch mechanism when the bumper frame is in vertical position;

FIG. 7 is an enlarged fragmentary side elevation similar to FIG. 6, showing the bumper latch mechanism during movement of the bumper frame from vertical to horizontal position in dot-dash lines, and in horizontal position in full lines;

FIG. 8 is a fragmentary sectional view taken on line 8—8, FIG. 6;

FIG. 9 is a sectional view taken on line 9—9, FIG. 6; and

FIG. 10 is an enlarged fragmentary sectional view taken on line 10—10, FIG. 1.

Similar numerals refer to similar parts throughout the drawings.

DESCRIPTION OF THE PREFERRED EMBODIMENT

The improved tractor bumper construction is generally indicated at 1, and is shown mounted on a usual tractor 2, (FIG. 1) and has two ballast weights 3 mounted thereon.

Bumper 1 includes a front frame assembly 4 pivotally mounted on a pair of mounting brackets 5 and supported by a latching mechanism, indicated generally at 6, (FIGS. 3, 4 and 5).

Brackets 5 are bolted to each side of the tractor frame 7 by pairs of bolts 8. Bolts 8 extend through pairs of holes 9 formed in the rear portions of brackets 5 and through spacers 10. Spacers 10 preferably are welded at 11 to the inner surfaces 12 of brackets 5 and align with holes 9.

Spacers 10 provide clearance between brackets 5 and a tractor hood assembly 13 to enable hood 13 when pivotally attached to tractor frame 7, as indicated at 14, to swing forward on its pivotal mounting. A rubber washer 15 may be located at the end of each spacer 10 around bolt 8 to provide a firm seating for brackets 5 when connected to frame 7 by bolts 8.

The front end portion of each bracket 5 (FIGS. 7 and 8) is formed with a hole 16 and a slot 17. Slot 17 extends inwardly from the front edge 18 of bracket 5 in horizontal alignment with hole 16. The lower corner of edge 18 preferably is rounded at 19.

Frame assembly 4 has a lower channel 20 having a web 21 and upper and lower flanges 22 and 23, respectively.

An inverted U-shaped member 24 is welded at 25 to the ends of upper flange 22, and extends upwardly therefrom (FIG. 3). A plurality of spaced grill posts 26 extend vertically between and are welded at 27 to the top portion of frame member 24 and channel flange 22.

Posts 26 and frame member 24 provide a protective grill-like frame structure which protects the tractor radiator 28 and headlights 29. Posts 26 and frame member 24, likewise, form a plurality of openings 30 for receiving and mounting ballast weights 3 on the bumper frame.

A plate member 31 is welded at 32 to each end of channel 20 at the inner surface of web 21, and extends rearwardly therefrom (FIGS. 5 and 6) and is connected to mounting brackets 5 by latch mechanism 6. Each plate 31 preferably is rectangular and is formed with a hole 33 adjacent the rear of free edge 34. A slot 35 is formed between hole 33 and channel 20 in plates 31 (FIGS. 7 and 8), the function of which is discussed below.

A small stiffening member 31a may be welded at 32a to interconnect plates 31, frame member 24 and channel 20 (FIG. 6).

A boss 36 preferably is attached to the corner between web 21 and upper flange 22, intermediate the ends of channel 20, and extends outwardly downwardly therefrom (FIG. 6). Boss 36 engages tractor front axle housing 37 (FIG. 2) when frame 4 is pivoted downwardly on latch mechanism 6 to hold frame 4 in its horizontal position.

Various small items such as bails of hay, wire and the like, may be supported on frame 4 when in the horizontal position (FIG. 2) and carried to a work or storage site.

A hitch plate 38 may be welded at 39 to the front of channel 20 and is provided with a hole 40 for coupling various farm implements.

In accordance with the invention, latch mechanism 6 pivotally mounts frame 4 on brackets 5, and latches frame 4 in vertical position, rigidly supporting frame 4 and weights 3 carried thereby.

Pivot pins such as bolts 41 extend through holes 16 and 33 in brackets 5 and plates 31, respectively, pivotally mounting frame 4 on brackets 5. A washer 42 (FIG. 8) is mounted on bolt 41 between each bracket 5 and plate 31 to provide a pivot bearing point and to reduce friction. A nut 43 threaded on the end of each bolt 41 holds the brackets 5 and plates 31 assembled.

A lever post 44 is welded at 45 to the bottom of each plate 31 (FIG. 6) and extends downwardly therefrom. A lever 46 is pivotally mounted on a bolt 47 which extends through the lower ends of posts 44 and levers 46. A number of washers 48 preferably are mounted on bolt 47 (FIG. 9) between post 44 and lever 46, and nut 49 adjustably clamps lever 46 to post 44.

A pin 50 is attached to each lever 46, intermediate the ends thereof. A bolt welded at 51 (FIG. 9) may form the pin 50 which extends through slot 35 in plate 31 and engages in slot 17 (FIG. 6) when frame 4 is in vertical position to latch frame 4 in such position.

A nut 52 is staked on the outer end of each pin bolt 50 spaced from plate 31 a distance slightly greater than the thickness of bracket 5. This spacing permits pins 50 which extend through slots 35 to move in slots 35 while snapping into latched position in slots 17.

Bolts 41 and 50, and nuts 43 and 52 may be staked at 41a to hold the nuts 43 and 52 in position after they have been adjusted to the desired clamping position.

A spring 53 biases lever 46 toward the rear end of plate 31 and biases pin 50 toward the right of slot 35 (FIG. 6). One end 54 of spring 53 is engaged in an opening 55 in rear edge 34 of plate 31 and the other end 56 of spring 53 is engaged in a notch 57 formed in lever 46.

The operation of latch mechanism 6 in moving frame assembly 4 between vertical and horizontal position is shown in FIGS. 6 and 7.

In the vertical position (FIG. 6), plates 31 extend horizontally outwards from brackets 5, supported on pin bolts 41 and 50. Pins 50 are retained within slots 17 of brackets 5 by springs 53 acting on lever 46.

One of the important aspects of the invention is the multiple support of frame 4 and attached weights 3 on two pins 41 and 50. In prior pivotally mounted bumpers, the entire load of bumper and weights was supported by a single pivot pin, one on each side of the vehicle.

Mounting plates 31 are rigidly latched in the horizontal position of FIG. 6 and are prevented from movement in any direction by pins 41 and 50, and nuts 43 and 52 staked thereto.

Frame 4 may be lowered from vertical to horizontal position, by pulling levers 46 forward, and disengaging pins 50 from bracket slots 17. Frame 4 is then moved downwardly in a counterclockwise direction about pivot pins 41, as shown in dot-dash lines in FIG. 7.

Levers 46 may be released after disengaging pins 50 from slots 17, and pins 50 will ride easily along rounded corners 19 of brackets 5.

Boss 36 engages front axle housing 37 (FIG. 2) after frame assembly 4 has moved through an angle of approximately 90° to maintain frame 4 in a horizontal position. Plates 31 extend downwardly from brackets 5 and are supported by pivot pins 41 when frame 4 is in the horizontal position, as shown by solid lines in FIG. 7.

Any weights 3 which may have been mounted on frame 4 when in vertical position, preferably are removed prior to moving frame 4 to horizontal position.

Movement of frame 4 from horizontal to vertical position is accomplished easily by pulling upwards on frame 4, pivoting plates 31 in a clockwise direction about pins 41 (FIG. 7). Pins 50 will move automatically from their biased position at the rear of slots 35 when contacting and moving along rounded corner 19 (dot-dash lines, FIG. 7), eliminating any manual movement of levers 46 by the tractor operator.

Pins 50 will move automatically into slots 17 after passing rounded corners 19 by the action of springs 53, firmly latching frame 4 in vertical position.

Although the bumper construction 1 provides protection to the front end of a tractor and is movable away from the tractor front to permit the hood to be moved to uncover the engine, it also provides a mounting rack for ballast weights when in vertical position.

Weights 3 may be generally rectangular in shape (FIG. 10) and formed with front and rear top slots 58 and 59, respectively, and a bottom slot 60.

Slot 58 provides a handhold to facilitate placement of weights 3 in frame openings 30. When mounted on frame 4, top flange 22 of channel 20 is seated in bottom slot 60 and the top of U-shaped frame member 24 extends partially into rear top slot 59.

Top slot 59 is formed deep enough to provide space below frame member 24 when in mounted position, to enable weight 3 to be raised vertically upwardly permitting rear edge 61 of weight 3 to swing frontward and rearward past channel 20 for mounting and removal of weight 3.

An upper rear flange 62 is formed on weight 3 by rear slot 59 and is provided ith a threaded opening 63. A bolt 64 extends through opening 63 and engages the top of frame member 24 to clamp weight 3 securely within frame opening 30.

Weights 3 may have various shapes, sizes and attachment means for mounting on frame 4 in order to provide a complete range of weight which may be added to bumper 1.

The improved tractor bumper construction 1 has a number of advantageous features. Frame 4, mounting brackets 5 and latch mechanism 6 are easily and inexpensively formed and fabricated from metal plates and then bolted together providing a sturdy and durable construction.

Frame 4 is pivoted forward easily by the simple operation of levers 46 which release the latching mechanism, and is returned to its vertical, protective position by merely raising the frame with the latch mechanism automatically latching the frame in position.

Frame 4 may also function as a load carrier when in horizontal position by engagement of boss 36 with front axle housing 37 which maintains it in such horizontal position and provides support along with pivot pins 41.

Any desired number of weights 3 may be mounted easily and quickly on bumper 1 to provide ballast weight to the tractor for various farming operations. A hitch 38 also may be attached to the front end of bumper 1 for coupling various implements.

Another very important advantage of the improved tractor bumper construction is the double bearing support means provided by the latch mechanism on each side of the tractor. This enables a large weight load to be carried on frame 4 and held in a rigid, fixed position in front of the tractor to provide ballast as well as collision protection for the tractor.

Accordingly, the improved tractor bumper construction is simplified, sturdy and durable; provides an effective device for protecting the front end of a tractor which can be moved quickly and conveniently away from the tractor front permitting forward movement of the tractor hood assembly; provides a device for mounting of ballast weights to the front end of a tractor; provides a load carrier for sundry items; and provides for eliminating difficulties encountered with prior devices and solves problems and obtains new results in the art.

In the foregoing description, certain terms have been used for brevity, clearness and understanding; but no unnecessary limitations are to be implied therefrom beyond the requirements of the prior art, because such terms are used for descriptive purposes and are intended to be broadly construed.

Moreover, the description and illustration of the invention is by way of example, and the scope of the invention is not limited to the exact details shown or described.

Having now described the features, discoveries and principles of the invention, the manner in which the tractor bumper construction is constructed and used, the characteristics of the new construction, and the advantageous, new and useful results obtained; the new and useful structures, devices, elements, arrangements, parts, and combinations are set forth in the appended claims.

I claim:

1. Tractor bumper construction including a pair of mounting brackets having front edges formed with slots extending rearwardly from said front edges; means mounting one end of said brackets on a tractor member; bumper frame means having plate members pivotally mounted on the other end of said brackets and movable between vertical and horizontal positions, said plate members each being formed with an elongated slot; means releasably latching the frame means in vertical position; the latch means including lever means movably mounted on the plate members, first pin means mounted on the lever means and extending from the lever means through the plate members elongated slots; said first pin means being releasably interengageable in the mounting bracket slots to hold the frame means in vertical position; spring means connected to the lever means biasing the first pin means toward interengageable position; and second pin means forming a pivotal connection between the frame means and mounting brackets for moving the frame means to horizontal position when the first pin means is released from the mounting bracket slots by forward movement of the lever means.

* * * * *